United States Patent
Casbeer et al.

(10) Patent No.: US 11,180,388 B2
(45) Date of Patent: Nov. 23, 2021

(54) SYSTEM AND METHOD FOR TREATMENT OF WASTEWATER VIA ENHANCED ELECTROFLOTATION

(71) Applicant: Industrie De Nora S.P.A., Milan (IT)

(72) Inventors: Dana Casbeer, Angleton, TX (US);
Rubin Bariya, Houston, TX (US);
Sehul Patel, Richmond, TX (US);
Rudolf Matousek, Richmond, TX (US); Thomas Reeves, Rosenberg, TX (US)

(73) Assignee: INDUSTRIE DE NORA S.P.A., Milan (IT)

( * ) Notice: Subject to any disclaimer, the term of this patent is extended or adjusted under 35 U.S.C. 154(b) by 474 days.

(21) Appl. No.: 16/346,779

(22) PCT Filed: Oct. 31, 2017

(86) PCT No.: PCT/IB2017/056766
§ 371 (c)(1),
(2) Date: May 1, 2019

(87) PCT Pub. No.: WO2018/083594
PCT Pub. Date: May 11, 2018

(65) Prior Publication Data
US 2019/0308890 A1    Oct. 10, 2019

Related U.S. Application Data

(60) Provisional application No. 62/417,013, filed on Nov. 3, 2016.

(51) Int. Cl.
*C02F 1/465*    (2006.01)
*C02F 1/467*    (2006.01)
(Continued)

(52) U.S. Cl.
CPC ............ *C02F 1/465* (2013.01); *C02F 1/4674* (2013.01); *C02F 1/5281* (2013.01); *C02F 1/56* (2013.01);
(Continued)

(58) Field of Classification Search
CPC ...... C02F 1/465; C02F 1/4674; C02F 1/5281; C02F 1/56; C02F 1/66; C02F 11/127;
(Continued)

(56) References Cited

U.S. PATENT DOCUMENTS 3,547,800 A * 12/1970 Pan ..................... C02F 1/463
210/192
3,856,642 A * 12/1974 Lieb ................... C02F 1/46109
205/701
(Continued)

FOREIGN PATENT DOCUMENTS

CL    2009001281 A1    5/2009
CN    102215926 A     10/2011
(Continued)

OTHER PUBLICATIONS

International Search Report and Written Opinion dated Jan. 4, 2018 for related PCT App. No PCT/IB2017/056766.

*Primary Examiner* — Thomas M Lithgow
(74) *Attorney, Agent, or Firm* — D'Ambrosio & Menon, PLLC; Usha Menon (57) ABSTRACT

A method for treating wastewater involves electrolyzing a stream of seawater and wastewater mix within one or more electrolytic cells mounted outside a batch tank. The electrolyzed stream is piped to a quelling chamber which is mounted above the batch tank. A diluted polymer solution is injected at upstream of an in-line mixer piping into the quelling chamber substantially concurrently with the electrolyzed stream. The polymer solution and the electrolyzed (Continued)

stream are dispersed as a fine shower over residual seawater and wastewater in the batch tank. The polymer solution facilitates flocculation of the suspended solid particles and creates a distinct buoyant layer of flocculated solid particles attached with micro bubbles. A substantially clarified effluent is separated from the flocculated layer and neutralized prior to discharge. The flocculated layer is pumped from the batch tank to a dewatering system where entrained solids are compacted to a desired level. A centrate generated during the solids/sludge dewatering step is recirculated to the batch tank prior to addition of seawater during a subsequent treatment cycle as a supplement to the seawater.

24 Claims, 8 Drawing Sheets (51) Int. Cl.
| C02F 1/52 | (2006.01) |
| C02F 1/56 | (2006.01) |
| C02F 1/66 | (2006.01) |
| C02F 11/127 | (2019.01) |
| C02F 9/00 | (2006.01) |
| C02F 101/20 | (2006.01) |
| C02F 101/30 | (2006.01) |
| C02F 103/00 | (2006.01) |
| C02F 103/08 | (2006.01) |

(52) U.S. Cl.
CPC ............... *C02F 1/66* (2013.01); *C02F 9/005* (2013.01); *C02F 11/127* (2013.01); *C02F 2101/20* (2013.01); *C02F 2101/30* (2013.01); *C02F 2103/002* (2013.01); *C02F 2103/005* (2013.01); *C02F 2103/008* (2013.01); *C02F 2103/08* (2013.01); *C02F 2201/001* (2013.01); *C02F 2201/4618* (2013.01); *C02F 2209/42* (2013.01); *C02F 2301/046* (2013.01); *C02F 2303/04* (2013.01); *C02F 2303/185* (2013.01)

(58) Field of Classification Search
CPC .. C02F 9/005; C02F 2101/20; C02F 2101/30; C02F 2103/002; C02F 2103/005; C02F 2103/008; C02F 2201/001; C02F 2201/4618; C02F 2209/42; C02F 2301/046; C02F 2303/04; C02F 2303/185
USPC ...................................... 210/705, 707, 221.1
See application file for complete search history.

(56) References Cited

U.S. PATENT DOCUMENTS

| 3,943,044 | A | * | 3/1976 | Fenn, III | ................. | C02F 1/465 |
| | | | | | | 205/701 |
| 3,975,247 | A | * | 8/1976 | Stralser | ............... | C02F 1/46104 |
| | | | | | | 205/701 |
| 4,179,347 | A | * | 12/1979 | Krause | .................... | C02F 1/465 |
| | | | | | | 204/278.5 |
| 6,106,703 | A | | 8/2000 | Nassef | | |
| 8,668,832 | B2 | | 3/2014 | Bariya et al. | | |
| 2003/0070993 | A1 | | 4/2003 | Stephenson | | |
| 2004/0099607 | A1 | * | 5/2004 | Leffler | ................. | C02F 1/4672 |
| | | | | | | 210/704 |
| 2007/0158176 | A1 | * | 7/2007 | Briggs | ................. | C02F 1/4606 |
| | | | | | | 204/164 |
| 2010/0122913 | A1 | | 5/2010 | Matousek | | |
| 2010/0307984 | A1 | | 12/2010 | Mortensen | | |
| 2012/0103882 | A1 | * | 5/2012 | Hamann | ............. | B03D 1/1412 |
| | | | | | | 210/150 |
| 2012/0160706 | A1 | * | 6/2012 | Poirier | ................. | C02F 1/4674 |
| | | | | | | 205/756 |
| 2016/0009583 | A1 | | 1/2016 | Poirier | | |

FOREIGN PATENT DOCUMENTS

| CN | 102515398 A | 6/2012 |
| CN | 104245595 A | 12/2014 |
| EP | 2835356 A1 | 2/2015 |
| JP | 2012509170 | 4/2012 |
| WO | 2017/072403 A1 | 5/2017 |

* cited by examiner

SYSTEM AND METHOD FOR TREATMENT OF WASTEWATER VIA ENHANCED ELECTROFLOTATION

TECHNICAL FIELD

The present invention relates to wastewater treatment and, in particular, to the oxidation and removal of wastewater contaminants, including, suspended solids, organics, heavy metals and bacteria using mechanically-induced electroflotation.

BACKGROUND

There are a few conventional processes for removal of solids/suspended impurities in water. However, each of these processes has associated disadvantages as described below.

Dissolved air flotation (DAF) is a water treatment process that clarifies wastewater by the removal of suspended matter such as oils and greases or solids. The removal is achieved by dissolving air in wastewater under pressure using either an external compressed air supply or an air supply from a blower unit and then releasing the air at atmospheric pressure in a flotation tank basin. The released air forms microbubbles which adhere to the suspended matter in the wastewater causing the suspended matter to float to the surface of the water where it may then be removed by a mechanical skimming device. However, it is difficult to produce the most optimum fine bubble size (bubble flux) to effectively float the suspended matter without specialized, costly diffusers and high pressure air feeds. Also, since bubble diffusers mounted in the bottom of a DAF tank cannot provide 100% coverage of the tank's surface area, allowing portions of the wastewater to ultimately bypass the DAF flotation process without being treated. Furthermore, since the floating solids mass remains on the surface of the water, mechanical skimming devices or pumps are required to effectively remove the solids from the tank. While DAF is more mechanically intensive, it is not suitable for locations such as offshore drilling platforms where equipment maintenance is likely to be neglected.

Electroflotation (EF), which involves flotation by electrically generated bubbles, is another process for removal of floating ions or solid solids, suspended or dissolved in a liquid phase. EF requires a cathode (that may be made of non-oxidizing material) and an anode (that may be made of iron or aluminum). Electrode plates or packs may be connected to an electric power source, and positioned within a flotation tank under the water surface. During electrolysis, the electrode plates/packs generate small gas bubbles (e.g., $O_2$, $H_2$) which are then attached to the pollutants (e.g., suspended solids) in the water before they begin to float upward in a flotation tank where they can be more easily collected and removed. However, producing the correct bubble size requires certain electrical power control over the submerged electrode plates/packs. Traditional EF process suffers the drawback of requiring continuous maintenance due to the layer of iron or aluminum hydrates and oxides that forms on the surface of the electrodes, without separating from them, so that over time the electric current decreases and therefore so does the formation of hydrates. Another drawback is that the electrodes are subjected to uneven wear, with the need to replace them often before they are completely worn. Also, maintenance on the electrode plates/packs requires either draining of the flotation tank or removal of the electrodes from the water volume to service. Since the electrode plates/packs mounted in the bottom of the tank often do not produce a 100% coverage of the tank's water surface area, allowing portions of the wastewater to ultimately bypass the flotation process and exit the treatment unit untreated. Furthermore, since the floating solids mass remains on the surface of the water column, similar to the DAF process, various mechanical skimming devices or pumps are required to effectively remove the solids from the tank.

For these reasons, the wastewater treatment industry especially marine sewage treatment industry is in need of a technically and economically viable system for efficient solids separation, organics and bacteria removals.

SUMMARY OF THE INVENTION

In accordance with one or more embodiments, the invention relates to a system and method for treating wastewater. In an embodiment, the invention relates to a method for treating wastewater or marine wastewater.

According to an embodiment, a system for treating wastewater (or "treatment system") is comprised of a main batch sewage treatment tank with level control system, a locally mounted electrical control panel, a highly efficient electrolytic cell(s), blower for hydrogen dilution, and an on-skid automatic polymer blending/mixing system. The treatment system further includes a dechlorination unit comprising a ship-loose sodium sulfite/bisulfite storage/dechlorination (neutralization) tank and a chemical injection pump. The dechlorination unit ensures that chlorine-free International Maritime Organization (IMO)-compliant effluent is discharged to the sea. The treatment capacities of the treatment system range from 4.85 to 49.95 cubic meters per day, while utilizing small installation floor space. In one aspect, the treatment system is used in marine and offshore installations requiring permanent or long-term operation for the treatment of marine sewage.

The treatment system is designed to operate in an automatic mode with very little operator intervention. Based on sewage treatment demand of the platform or vessel, the treatment system initializes sewage transfer and begins treatment processing. A manual operation mode is provided for troubleshooting and emergency pump out and/or flushing of the treatment system.

BRIEF DESCRIPTION OF THE DRAWINGS

The invention will be described in further detail below and with reference to the attached drawings all of which describe or relate to apparatus, systems and methods of the present invention. In the figures, which are not intended to be drawn to scale, each similar component that is illustrated in various figures is represented by a like numeral. In the figures.

DETAILED DESCRIPTION OF THE INVENTION

Depending on the context, all references below to the "invention" may in some cases refer to certain specific embodiments only. In other cases, it will be recognized that references to the "invention" will refer to subject matter recited in one or more, but not necessarily all, of the claims.

In an embodiment, the present invention relates to a system 100 for treatment of wastewater or marine wastewater containing suspended solids and other impurities (e.g., organic matter, bacteria, etc.). The system 100 is a batch treatment system that utilizes electrolytic cell(s) to generate an efficient oxidizer/micro-bubbles and uses polymer as a flocculation agent to create a "floating layer" of suspended solids which is effectively removed from the system at the end of each treatment cycle.

As used herein, the term "wastewater" includes any water to be treated such as black water and gray water from offshore platforms and marine vessels or a stream of wastewater from industrial, agricultural and municipal/residential sources, having solid pollutants of biodegradable material. Marine wastewater streams generally include black water, gray water and combinations thereof. The term "black water" refers to water contaminated with human waste that comprises coliform and other bacilli. The term "gray water" refers to used water absent human waste, such as water from galley, laundry, sinks and showers. Generally, marine wastewater is composed of both toxic and non-toxic organic and inorganic contaminants, micro and macro suspended solid contaminants comprising cellulose, sand, grit, human biomass, and emulsions and gases. The pollution potential of combined black water and gray water is indicated by several wastewater parameters, biochemical oxygen demand (BOD), chemical oxygen demand (COD), coliform bacteria, and suspended solids (SS) being the major ones. TSS may be organic in nature and can serve as safe havens for harmful bacteria and other microorganisms. The terms "wastewater", "sewage" and "marine wastewater" are used interchangeably in this document.

In another embodiment, the invention relates to a method and/or treatment cycle for treating wastewater. The method involves electrolysis and an enhanced/mechanically-induced electroflotation stage for efficiently separating suspended solids and for clarifying the water. In a first step, an electrolytic cell(s) can be used to generate disinfectant (e.g., sodium hypochlorite) which helps to oxidize organic matter and create micro-bubbles (hydrogen/oxygen). These bubbles are able to lift any suspended solid matter in a batch tank water volume. In a second step, a small amount of polymer can be mixed in-situ within a mixing spool of piping in the system. The process flow through the mixing spool ensures good dispersion of the blended polymer in the wastewater stream. Polymer added coupled with micro bubbles from the first step create an electroflotation condition to facilitate solid agglomeration and flotation at the liquid surface. The method further involves treating wet polymerized solids waste/sludge generated during the treatment process to obtain a centrate and a compacted sludge for landfill disposal. The centrate may be used to supplement seawater or reduce the volume of seawater used during a subsequent wastewater treatment cycle.

Figure 1A:
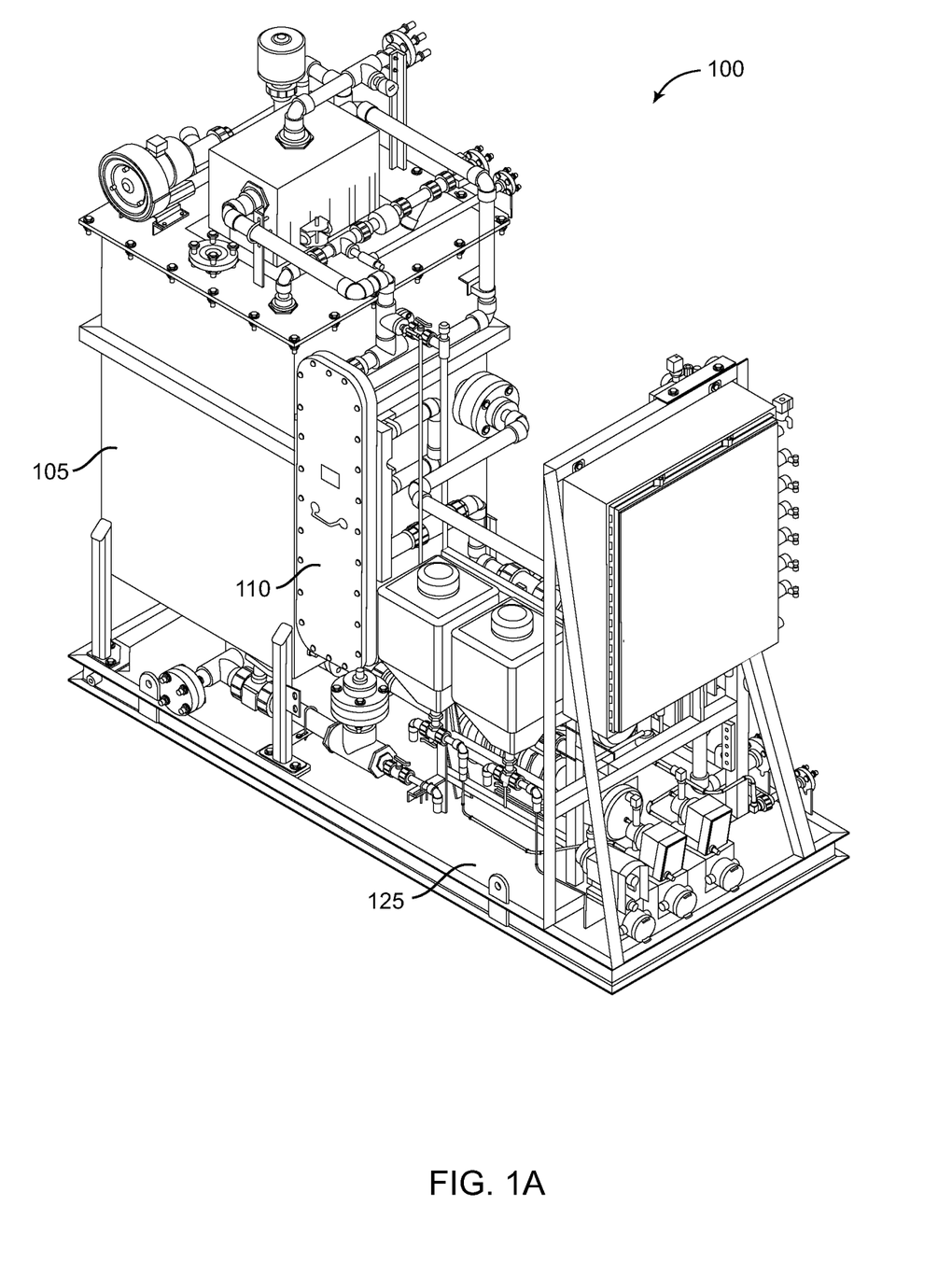
FIGS. 1A and 1B illustrate multiple views of an exemplary system for treating wastewater according to an embodiment.
Figure 1B:
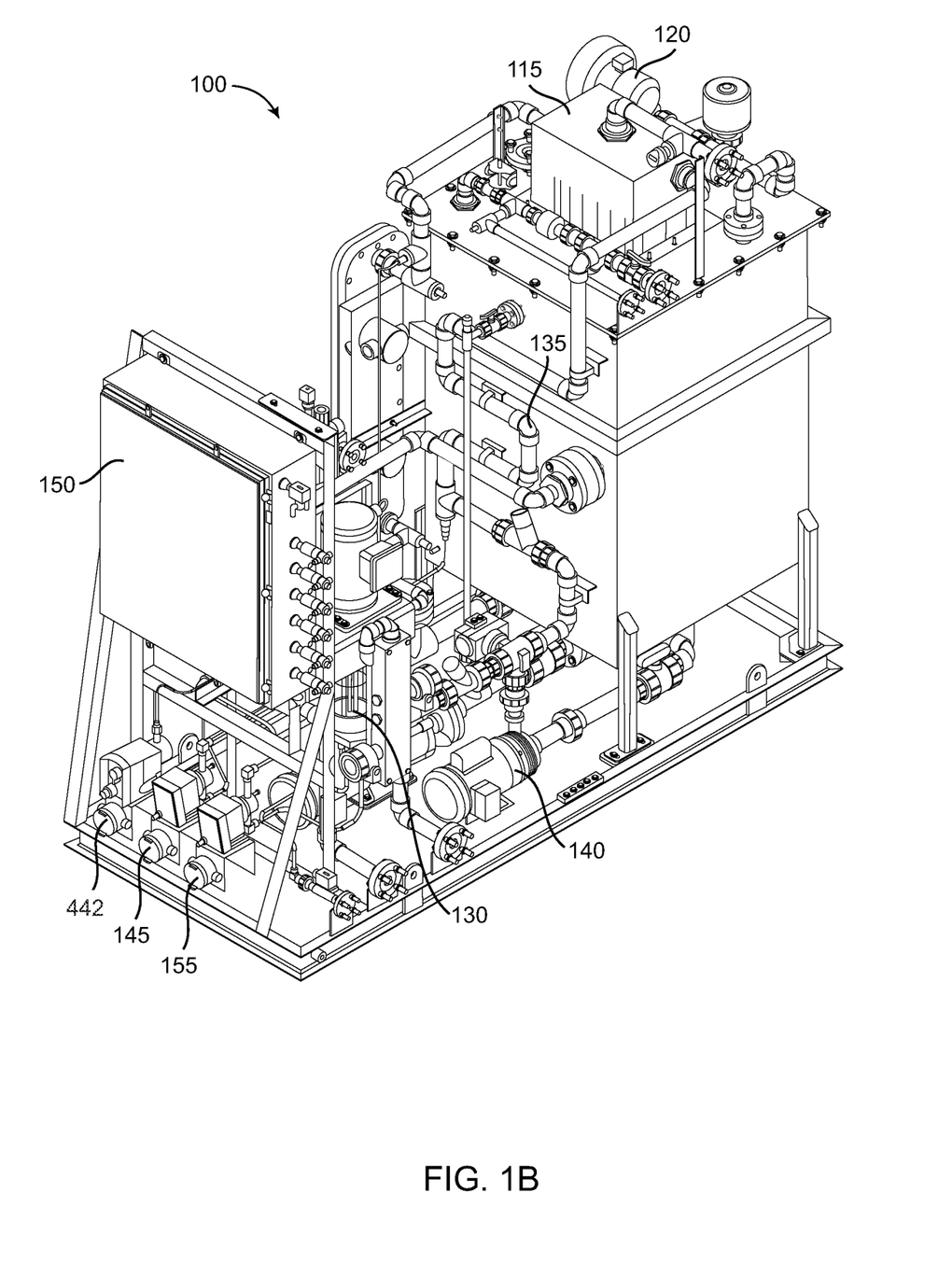

FIG. 1A and FIG. 1B illustrate multiple views of a specific, non-limiting, embodiment exemplifying a system 100 for treating wastewater. The system 100 includes a single batch tank 105 for receiving wastewater to be treated. The batch tank 105 is also designed to contain seawater that is to be mixed with the wastewater. In an exemplary embodiment, the batch tank 105 is made of carbon steel, coated in a corrosion-resistant acrylic polyurethane coating. The batch tank is configured in such a way that allows to withdraw sludge and clarified effluent from the base of the tank. In conventional tanks, as you draw clarified effluent out from the base, the remaining sludge may plug/clog other devices in the tank (for example, electrolytic cells) causing maintenance problems. As such, in conventional tanks, solid waste would have to be removed from the top which would another unit operation to the process. This adds to the operation cost by requiring the addition of paddles, skimmers and other mechanical devices.

The system components, including, the batch tank 105, the electrolytic cell 110, a polymer mixing device or system 130, etc. are conveniently mounted on a skid 125. The skid 125 may comprise a compact steel base frame. Other system components are described with reference to FIG. 4. Additional process equipment, such as pumps, pipes, sensors or valves may be employed throughout the system 100. The system 100 is configured to operate in an automatic batch mode with minimal operator intervention. The system 100 can initialize sewage transfer and commence treatment based on sewage treatment demand of the marine vessel.

The batch tank 105 is in fluid communication with an electrolytic cell 110. As used herein, the term "electrolytic cell" can encompass one, two or multiple electrolytic cells (for example, for use on larger marine vessels or treatment units). The electrolytic cell 110 is intentionally positioned outside the batch tank 105. This reduces the components/parts contained within the batch tank 105. This also minimizes corrosion/wear and tear and makes it more convenient to service the electrolytic cell 110. (If the cell were to be placed in the batch tank, the tank would have to be completely drained before conducting any maintenance work). A defoamer injection pump 442 is provided to inject a small amount of a diluted defoamer into an oxidized wastewater mixture leaving the electrolytic cell 110. Blower 120 can be configured to start when the electrolytic cell 110 is energized. A recirculation pump 140 is configured to recirculate an oxidized wastewater stream through the in-line mixing spool/piping 135.

The system 100 includes an electrical control panel 150. The control panel 150 is simple and easy to operate. The control panel 150 utilizes a switching power supply and smart relay controllers as the basis for safe and effective operation of the system 100. All system components may be pre-wired to the control panel 150.

Figure 2A:
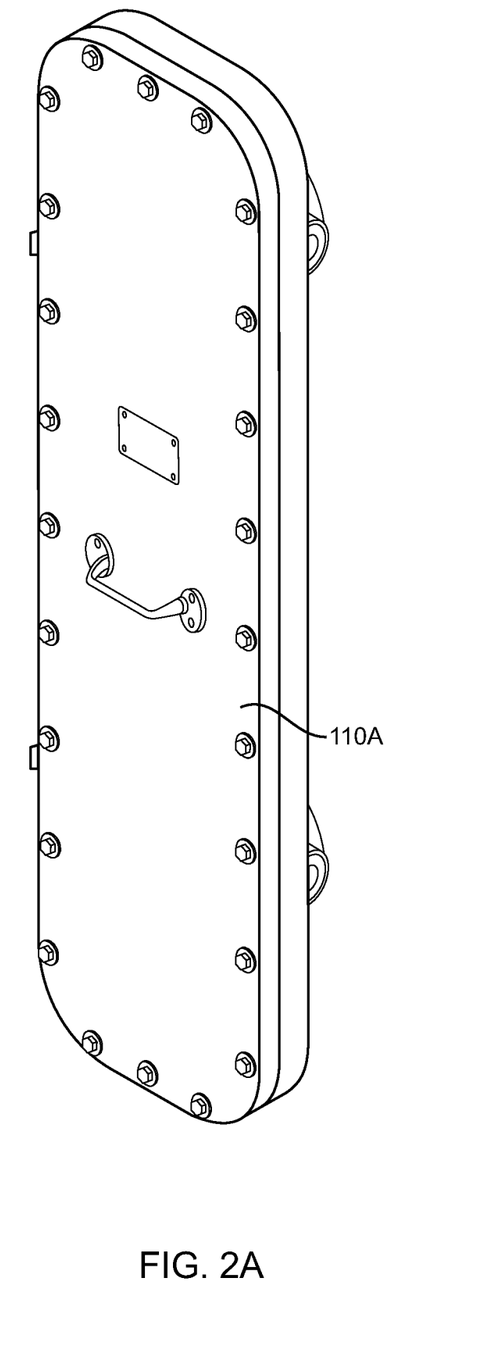
FIG. 2A illustrates an electrolytic cell according to an embodiment.
Figure 2B:
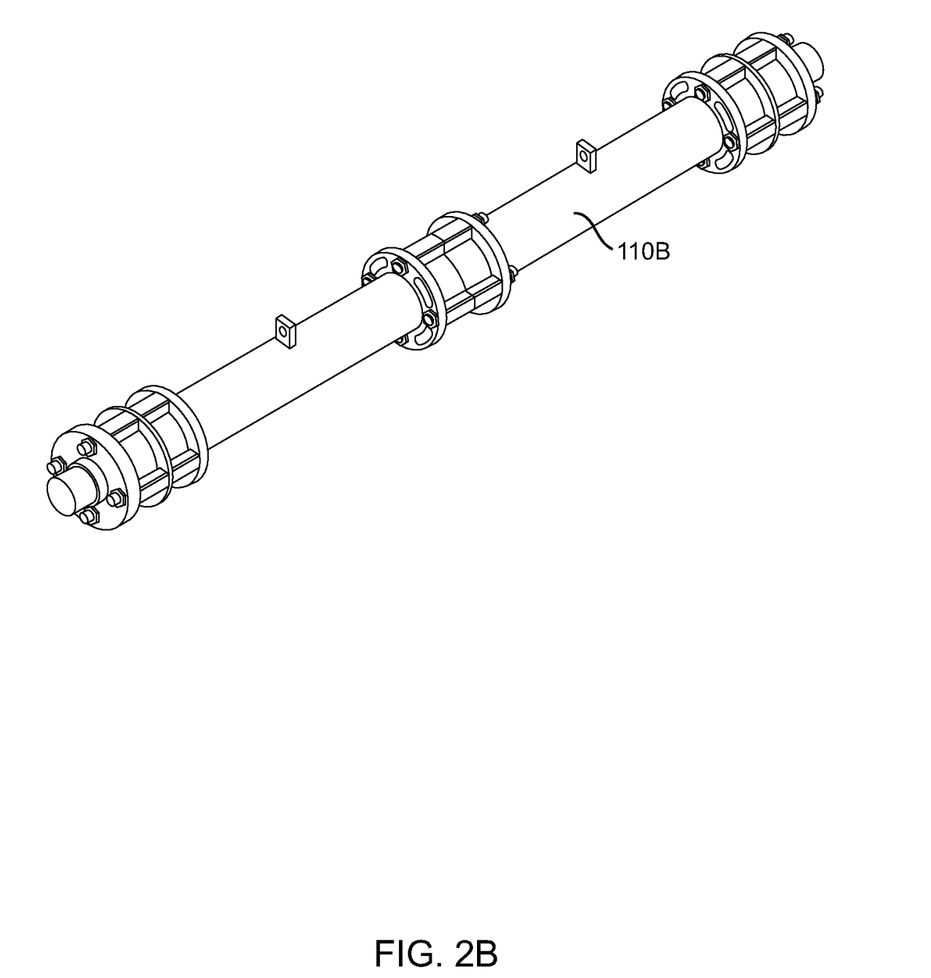
FIG. 2B illustrates an electrolytic cell according to another embodiment.

FIGS. 2A and 2B illustrate isometric views of two exemplary embodiments of the electrolytic cell 110A, 110B. The electrolytic cell can have a substantially flat/book-shaped housing 110A or a substantially cylindrical housing 110B. Irrespective of the housing geometry (110A, 110B), the electrolytic cell 110 is configured to function as a primary component for killing bacteria/pathogens in the wastewater by generating sodium hypochlorite and other mix oxidants from the seawater. The electrolytic cell 110 is equipped with one or more pairs of opposing electrodes (not shown) and means, for example, a DC power supply, for applying electrical current between the electrodes (not shown). The electrical polarity of the electrodes in the electrolytic cell 110 can be periodically (i.e., once every 24 hours when the treatment system is operated continuously) reversed to minimize maintenance. This action allows the self-cleaning of the electrodes to remove hardness (calcium and magnesium) deposits. The treatment system 100 does not use electrolytic cell(s) that contain sacrificial electrodes which are typically subjected to uneven wear, with the need to replace them often before they are completely worn.

Figure 3A:
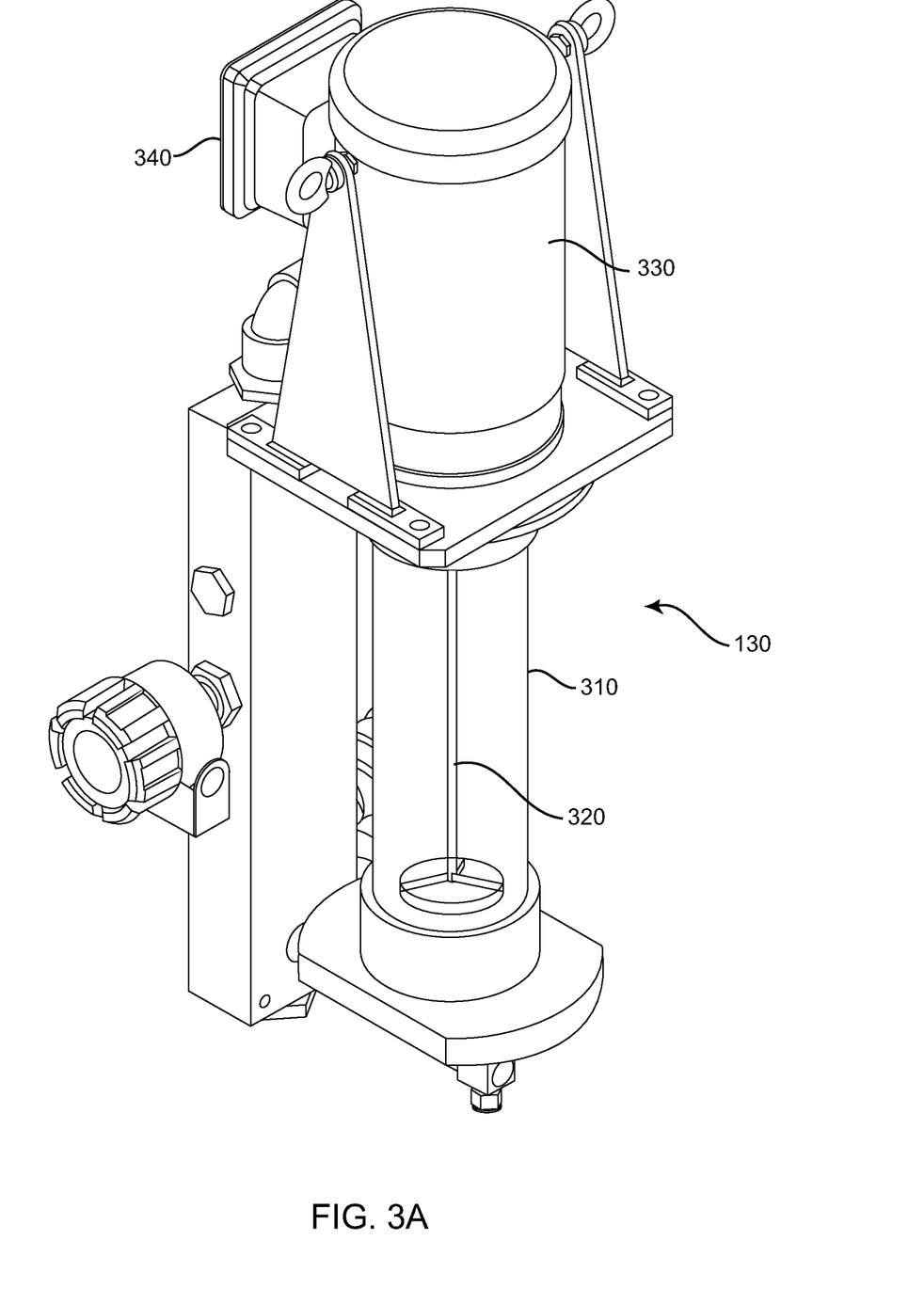
FIGS. 3A and 3B illustrate multiple views of an exemplary polymer mixing system according to an embodiment.
Figure 3B:
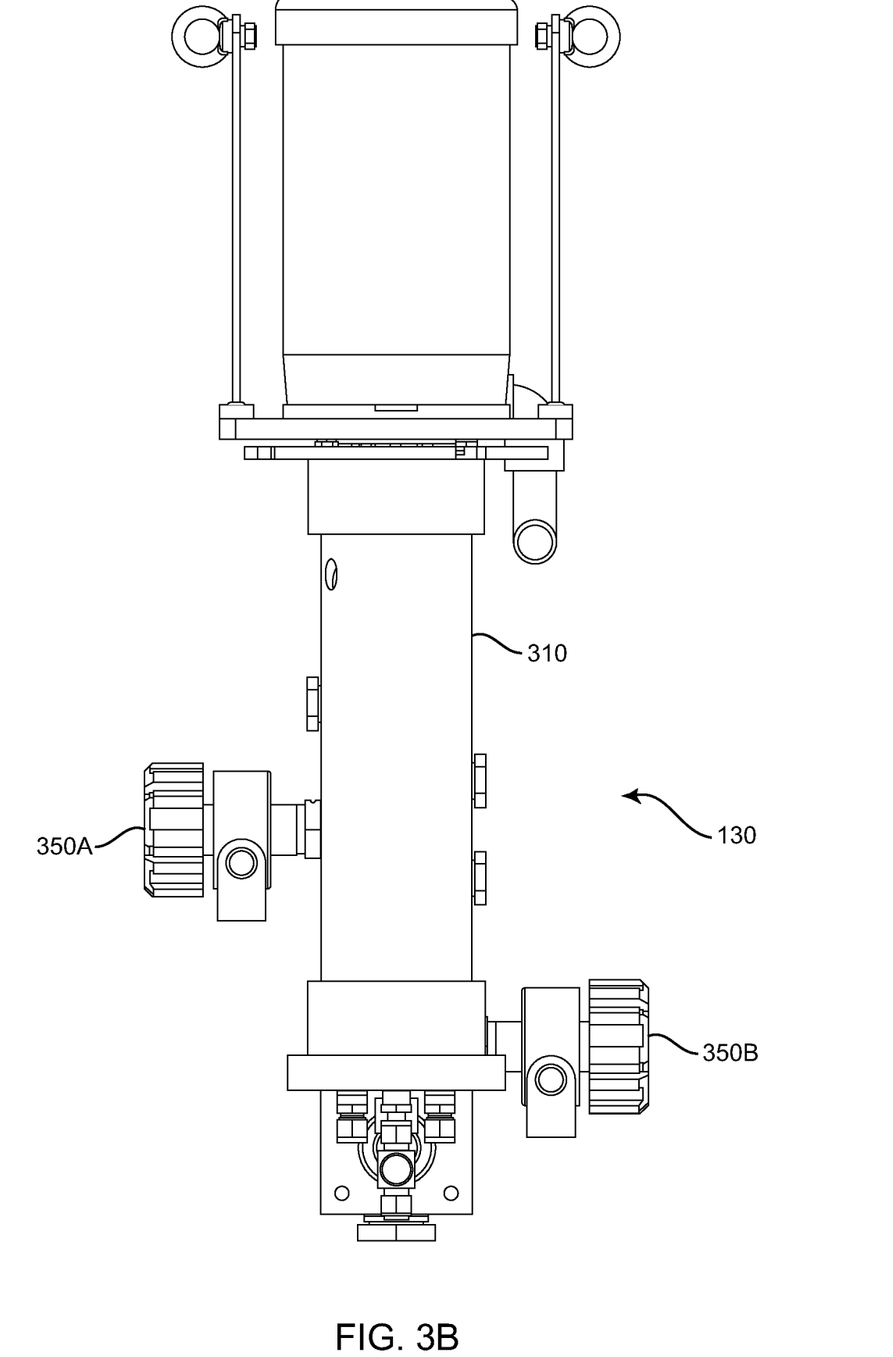

FIGS. 3A and 3B illustrate exemplary views of a polymer mixing system 130. A polymer mixing system 130 is provided to mix neat polymer with a premeasured volume of water, typically utility or service water. Either potable or non-potable water, with the exception of seawater, may be used.

Now referring to FIG. 3A, the polymer mixing system 130 includes a polymer mixing chamber/column 310. The polymer mixing chamber/column 310 includes an automatic high shear polymer mixer 320 for blending the neat polymer and non-potable water, with the exception of seawater to produce a diluted polymer solution. Due to the highly viscous nature of most polymers, proper mixing is essential to allow the polymer to disperse into the process flow effectively without polymer agglomerations and "fish eyes". (Fish eyes are globular or partly hydrated polymer caused by poor dispersion during the mixing process). In one aspect, the mixer 320 comprises a square hole high shear head. The polymer mixing system 130 is provided with a motor 330 and a junction box for electrical connection to the motor 330. The motor 330 is operably connected to the mixer 320 via a shaft—typically, a clear piece of pipe. The J-box 340 provides electrical connection for the polymer mixer motor.

Now referring to FIG. 3B, the polymer mixing chamber/column 130 includes two switches, a high liquid level switch 350A and a low liquid level switch 350B. The switches 350A and 350B are set at different heights to ensure that an optimal and accurate amount of diluted polymer is added upstream of the in-line static mixing spool/piping 135 in the recirculated oxidized wastewater even when the system 100 is tilted or is in an inclined position, for example, a 22.5 degrees inclination.

Referring back to FIGS. 1A and 1B, the diluted polymer is sent to the quelling chamber 115 through addition at upstream of the in-line static mixing spool/piping 135 by a diluted polymer injection pump 155.

An exemplary method for treating wastewater using the system 100 is described with reference to FIG. 4. A new batch treatment cycle commences with a fill cycle wherein a predetermined volume of seawater 405 is sent to the tank 105 by opening an automatic seawater inlet valve 407. The seawater is transferred to the tank 105 by an internal seawater sprayer 410. The sprayer 410 may be configured along a top portion of the tank 105. Seawater is a critical component of the treatment process since electrolytic oxidation/disinfection depends on it to generate a required amount of sodium hypochlorite for effectively removing organics and killing fecal coliform. The tank 105 is filled to a predefined tank level based on measurements received from a level sensor 409. It is understood that more than one level sensors can be used to detect the level of liquid in the batch tank 105. Once the predefined seawater level in the batch tank 105 is reached, the actuated seawater supply valve 407 is configured to automatically close/de-energize.

At the same time that the seawater stream is added to the batch tank 105, a stream of the neat polymer is pumped from the neat polymer storage tank 430 into the polymer mixing chamber/column 310 by the neat polymer injection pump 145. A premeasured volume of potable or non-potable water but excluding seawater 435 may be piped into the polymer mixing chamber/column 310 by opening valve 437. The neat polymer and potable or non-potable water but excluding seawater is blended very well by a high shear mixer (as shown in FIG. 3A) in the polymer mixing chamber/column 310 at a preset flow rate to establish a useable diluted/blended polymer solution for flocculation or agglomeration of solids suspended in the wastewater.

Once the predefined seawater level is reached, the level sensor 409 can transmit a signal to a sewage transfer pump to transfer wastewater 415. A flow controlling ball valve (not shown), or another mechanism known in the art, may be set on a sewage transfer pump to ensure a desired or optimal flow rate into the tank 105. Wastewater is filled in the batch tank 105 to a predefined level. When the predefined level is reached, the level sensor 409 can transmit a signal to terminate the wastewater transfer. The desired or optimal flow rates of the wastewater and seawater may be dependent on the treatment capacity of the system 100.

A liquid level gauge/liquid level sight glass 420 may be connected to one side of the batch tank 105. The level gauge 420 comprises a clear tube. The level gauge 420 provides a visual indication of an actual level of liquid in the batch tank 105 when the liquid level in the batch tank 105 changes. This provides a convenient mechanism for an operator to monitor and determine actual liquid levels in the batch tank 105.

Macerator/grinder pump 425 is then energized. Valve 422 is opened and a stream of wastewater and seawater mixture from the bottom of the batch tank 105 is routed through the macerator 425. The macerator 425 is configured to effectively grind or macerate solids found in the wastewater stream to a smaller particle size to provide numerous high surface areas to enhance treatment and to help the waste mixture to pass through the charged surfaces of the electrolytic cell 110 without fear of plugging/blinding the cell.

Diverter valve 427 is activated or energized to allow passage of the macerated wastewater mixture to the electrolytic cell 110. The valve 427 may be a seal flush solenoid valve. The electrolytic cell 110 is energized and the macerated wastewater mixture is effectively electrolyzed between opposing electrodes to form mixed oxidants. The oxidants primarily include sodium hypochlorite. Sodium hypochlorite can effectively oxidize the wastewater mixture. Sodium hypochlorite removes a significant amount of organics and destroys fecal coliform. When in operation, the electrolytic cell 110 can generate fine gas bubbles for support of the particulates at the water surface interface level. Recirculation of the wastewater mixture can be continued for a predetermined time period. For example, the waste slurry can be recirculated through the electrolytic cell 110 for about 5 to 20 minutes. Oxidized/electrolyzed mixture is piped from the electrolytic cell to a quelling chamber 115 that is in fluid communication with the batch tank 105. Blower 120 can be configured to start when the electrolytic cell 110 is energized. A regenerative blower 120 is used to force ambient air into the vent line.

A defoamer storage tank 440 is provided to store one or more diluted defoaming or antifoaming agents. In one aspect, the defoamer is an organic defoamer. The defoamer may be derived from naturally occurring tall oil fatty acids (TOFA) and polyols to form a polyol diester. During the oxidation/electrolysis cycle, a defoamer injection pump 442 is energized to inject a small amount of the diluted defoamer from the defoamer storage tank 440 into the oxidized wastewater mixture leaving the electrolytic cell 110. The defoamer is used to manage any excessive foam buildup that occurs from any gas entrained within the suspended solids and minimize foaming in the oxidized stream exiting the electrolytic cell 110. Also, normally, smaller bubbles coalesce into larger bubbles as they often roll across the cathode surface of the electrodes in the electrolytic cell 110. The inventors have discovered that the introduction of the defoamer discourages this coalescing action.

During electrolysis, small bubbles of hydrogen, oxygen and other residual gases are produced as by-products. These gases are entrained in the oxidized stream. Upon exiting the electrolytic cell 110, the process/oxidized stream mixed with sodium hypochlorite and gases is routed to a quelling chamber 115. The quelling chamber 115 is mounted over the batch tank 105. As the process stream mixed with sodium hypochlorite and gases enters the quelling chamber 115, the entrained gases produced during the electrolysis reaction, are diluted with ambient air to less than 25% of the lower explosive level or LEL of hydrogen in air. The diluted gases are positively vented out of the quelling chamber 115 to a safe location through a vent line 445. This ensures that at least the larger process gas bubbles are exhausted to the atmosphere in a safe manner Thus, the remaining process stream is substantially degasified with the exception of entrained micro/small gas bubbles.

The quelling chamber 115 further includes a distribution coalescing pack 450. The coalescing pack comprises a plurality of integral flow diffuser or diverter plates contained within a box/container. The oxidized stream containing the micro bubbles is directed over the coalescing pack 450. The stream is dispersed through the plates 450 from where it rains down/disperses onto the surface of water in the batch tank 105 as fine droplets instead of a continual stream or flow. The coalescing pack 450 increases the contact surface area of the stream to disperse it and remove its flow energy.

The bottom of the quelling chamber 115, which contains the plates 450, opens into the batch tank 105. The quelling chamber 115 slows down the flow of the stream and ensures that any solid particles in the stream do not break apart. Sensor 409 controls fill volume and ensures that a predetermined air gap is maintained between the base of the coalescing pack 450 and the surface of the water in the batch tank 105. This predetermined air gap is preset, for example, to about 2 inches to 8 inches, and preferably between 3-6 inches. This preset gap ensures effective solids separation in the batch tank 105.

Neat/concentrated polymer may be stored in a neat polymer storage tank/container 430. The neat polymer storage tank 430 may also be mounted on a skid (such as, 125 shown in FIGS. 1A and 1B). Alternately, the polymer may be drawn from a stock container or pail (not shown). The polymer is a flocculant/dewatering polymer that promotes aggregation or agglomeration of solids suspended in wastewater. The polymer can be a cationic polymer. In one aspect, the cationic polymer is a cationic polyacrylamide. For example, the polymer is a copolymer of acrylamide and a quaternized cationic monomer (or a polyacrylamide inverse emulsion) having a high molecular weight. The cationic polymer is a water soluble flocculating agent that is effective over a wide pH range (4.0-9.0).

As described earlier, the polymer mixing chamber/column 310 includes two switches 350A and 350B for detecting a first or a high level of the polymer solution and second or a low level of the polymer solution. It is critical to monitor the polymer levels in the polymer mixing chamber/column 310 in order to meet IMO discharge standards. Two switches are essential to ensure that a right amount of polymer blend/mix is added to the batch tank 105. Through experiments, the inventors discovered that when the treatment system was in an inclined position, having only a single switch was not sufficient to produce a desired amount of polymer mix in the batch solution. Therefore, the polymer mixing chamber/column 310 was configured with two switches as a safety feature to give a better control over the treatment process.

The recirculation pump 140 is energized and it starts recirculating the oxidized wastewater stream through the in-line mixing spool/piping 135 back to the quelling chamber 115. The diluted polymer injection pump 155 is also energized. This blended polymer solution is then added is injected upstream of the in-line mixing spool/piping 135 by diluted polymer injection pump 155. Similar to the substantially degasified process stream, the polymer solution is allowed to rain down the plates 450 into the batch tank 105. After the oxidized wastewater stream recirculation and diluted polymer injection cycle is complete, a short, quiet residence time (for example, about 5-15 minutes, and preferably, around 10 minutes) is observed in the batch tank. The quiet residence time facilitates the concentration of solids in the oxidized stream as a floating mass layer on the surface of the batch tank 105 liquid volume and separation of clear effluent from the floating layer.

The plates 450 located in the quelling chamber 115 are configured so that oxidized wastewater stream containing diluted polymer is dispersed into a calming shower onto the liquid surface interface of the tank's 105 volume. Subsequently, a very buoyant suspended solids mass is formed at the water surface, where micro bubbles are attached onto the agglomerated masses. The agglomerated particles form a floating layer on the top surface of the water in the batch tank 150. This phenomenon is referred as "electroflotation". Thus, the solid particles in the original wastewater stream are now suspended by gas bubbles on the surface of the water in the batch tank as a floating layer while below this floating layer is substantially clear treated effluent which can be discharged to the sea.

The polymer serves two functions. First, it attracts solid impurities suspended in the wastewater and neutralizes their surface charge. The charge neutralization is a key to the electroflotation process. Secondly, it acts as a flocculent to begin agglomeration of the solid impurities contained in the oxidized wastewater stream. The entrained micro bubbles from the electrolysis process are impacted at the water surface interface and promote floating of the agglomerated particles found in the wastewater stream. The density of the agglomerated particles is such that it stays above the surface of a substantially clarified effluent.

After the quite residence time, valve 459 is actuated by solenoid to facilitate the passage of the clarified effluent. A recirculation pump 140 is energized to withdraw a clarified effluent through valve 457 and send to sea or to any designated site. Prior to discharge overboard, a clarified effluent stream is neutralized by adding sulfate-based chemical. A neutralized treated stream 485 is now substantially free of any residual chlorine. As the clarified effluent is removed, the slick agglomerated sludge layer rides down the walls of the batch tank 105 and sticks to the sides of the tank. In one aspect, a portion of one or more sidewalls of the batch tank 105 slopes inward to facilitate the falling of the sludge to the bottom of the batch tank 105. The solids trap 455 is configured in proximity to the bottom of the batch tank 105. The solids trap 455 comprises a piping fixture having a substantially "mushroom" shaped cap. The solids trap 455 is configured to ensure that there is no cross contamination of the agglomerated sludge with the clarified effluent during pump out or discharge. In other embodiments, the cap may be bell, convex or umbrella-shaped. In another aspect, the solids trap 455 may be a "P-trap" piping fixture.

The solids trap 455 is further configured to prevent the pumping out of the sludge with clarified supernatant/effluent. A "stop level" may be set at the top surface of the solids trap 455. When the sensor 409 detects that the effluent level has reached the stop level, the recirculation pump 140 is deenergized. This action stops the draining of the clarified effluent from the batch tank 105 so that the agglomerated mass does not get discharged along with the clarified effluent. Thus, the solids trap 455 acts as a trap for the agglomerated mass (because of the consistency/density of the agglomeration).

A small volume of clarified effluent may remain in the batch tank 105. The batch tank 105 further includes a wash down sprayer 460. The wash down sprayer 460 is located within the batch tank 105 beneath seawater sprayer 410 and above a solids trap 455. Sprayer 460 promotes an internal washing of any solid particles or debris along the inside walls of the tank 105 at the beginning of each fill cycle. The wash down sprayer 460 can be used to mix the solids remaining in the batch tank 105 with the residual clarified effluent to create a slurry. This "tank wash" step allows proper cleaning of sidewalls of the tank 105 and facilitates proper mixing of slurry for ease of withdrawal from the tank 105 during solids discharge cycle. The slurry includes about 0.8-2.5 wt. % solids. Valve 422 is repositioned (or energized) to withdraw slurry through the bottom of the tank. solids trap 455. The macerator 425 is energized to recirculate slurry through valves 427 and 462 and back to the batch tank 105. This step is called "Rinse Step" to prepare the remaining wet solids for discharge. After a short period of time, valve 462 is then repositioned to allow for discharge to solids dewatering/handling system or customer's solids storage tank. The macerator pump 425 transfers the wet solids until a low shutoff level measurement is detected by a level sensor 409 in the batch tank 105. Upon reaching the low shutoff level, the macerator pump 425 is de-energized. Discharge valve 462 is de-energized and reverts back to its "normal" position. This essentially completes one complete batch treatment cycle. The batch tank 105 is now empty again, and seawater can begin to fill the batch tank for the next treatment cycle. The automatic batch operation cycle can continue unless the system 100 is physically taken out of the automatic mode of operation or unless the system encounters a fault or alarm.

Referring again the neutralizing process, in one aspect, a dechlorination unit 480 is provided. The dechlorination unit 480 includes a chemical injection pump or a metering pump 475. The substantially clarified treated effluent leaving the batch tank 105 may be dechlorinated by addition of optimal amounts of one or more dechlorination chemicals, such as, sodium bisulfite, sodium sulfite, sodium thiosulfate or sulfur dioxide prior to its discharge overboard. A start signal may be sent to the dechlorination unit 480 to inject dechlorination chemical into the clarified effluent discharge stream. The dechlorinated effluent is pumped overboard until a "low level" switch point is detected by sensor 409 in the batch tank 105. This de-energizes the recirculation pump 140 and the dechlorination signal is removed. The effluent discharge valve 459 is de-energized back to its "normal" position.

The chlorine content of the discharged effluent (<0.5 mg/L) is configured to meet the requirements of Resolution MEPC.227(64) of the IMO for effluent release to the marine environment without further processing. The dechlorinated effluent is environmentally safe and substantially free of residual chlorine.

The dechlorinated effluent 485 may be gravity drained overboard through piping. For example, the system 100 may comprise a stainless steel centrifugal overboard pump (not shown) to discharge the dechlorinated effluent overboard. The discharged effluent comprise fecal coliform less than 100 cfu/100 ml, $BOD_5$ less than 17 mg/L, COD less than 84 mg/L, TSS less than 23 mg/L, pH between 6 and 8.5, and total residual chlorine less than 0.5 mg/L.

In one aspect, an online turbidity sensor/transmitter 470 monitors the turbidity/total suspended solids levels in the clear treated effluent prior to it being dechlorinated and discharged to overboard. The online turbidity sensor 470 can be positioned such that it can detect turbidity (in Nephelometric Turbidity Unit (NTU)) in the discharge effluent either prior to and/or after the dechlorination chemical is injected into it.

In one aspect, the discharged 0.8 to 2.5 weight % wet solids/sludge 465 may be collected in an off-skid sewage collection/equalization tank. The sewage collection/equalization tank (not shown) may be provided by a customer/user of the system 100.

In another aspect, the discharged 0.8 to 2.5 weight % wet solids/sludge 465 from the batch tank 105 can be subjected to further treatment, such as, dewatering treatment. FIG. 5 illustrates an exemplary block diagram for a system 500 for dewatering or compacting the sludge generated during the wastewater treatment process described earlier with reference to FIG. 4. Dewatering system 500 is a centrifuge-based sludge dewatering system. The dewatering system 500 is configured to effectively dewater the sludge, which contains 0.8-2.5 weight % wet solids, to a point where the dewatered sludge contains 10-13 weight % solids. The dewatered sludge can be classified as a "Class B" type sanitary waste product that may be disposed of in an approved Class B Municipal Solid Waste Landfill Facility, without the need for further treatment ashore at a municipal treatment location. The operation of this dewatering system 500 can be automated. The dewatering system 500 can communicate with the treatment system 100 via a centrifuge system control panel (not shown).

The dewatering system 500 is operated in an automatic mode. The dewatering system 500 is configured to transmit a signal, namely, a "centrifuge ready to receive" signal when it is ready to commence dewatering operations on a sludge discharge received from the treatment system 100.

Figure 4:
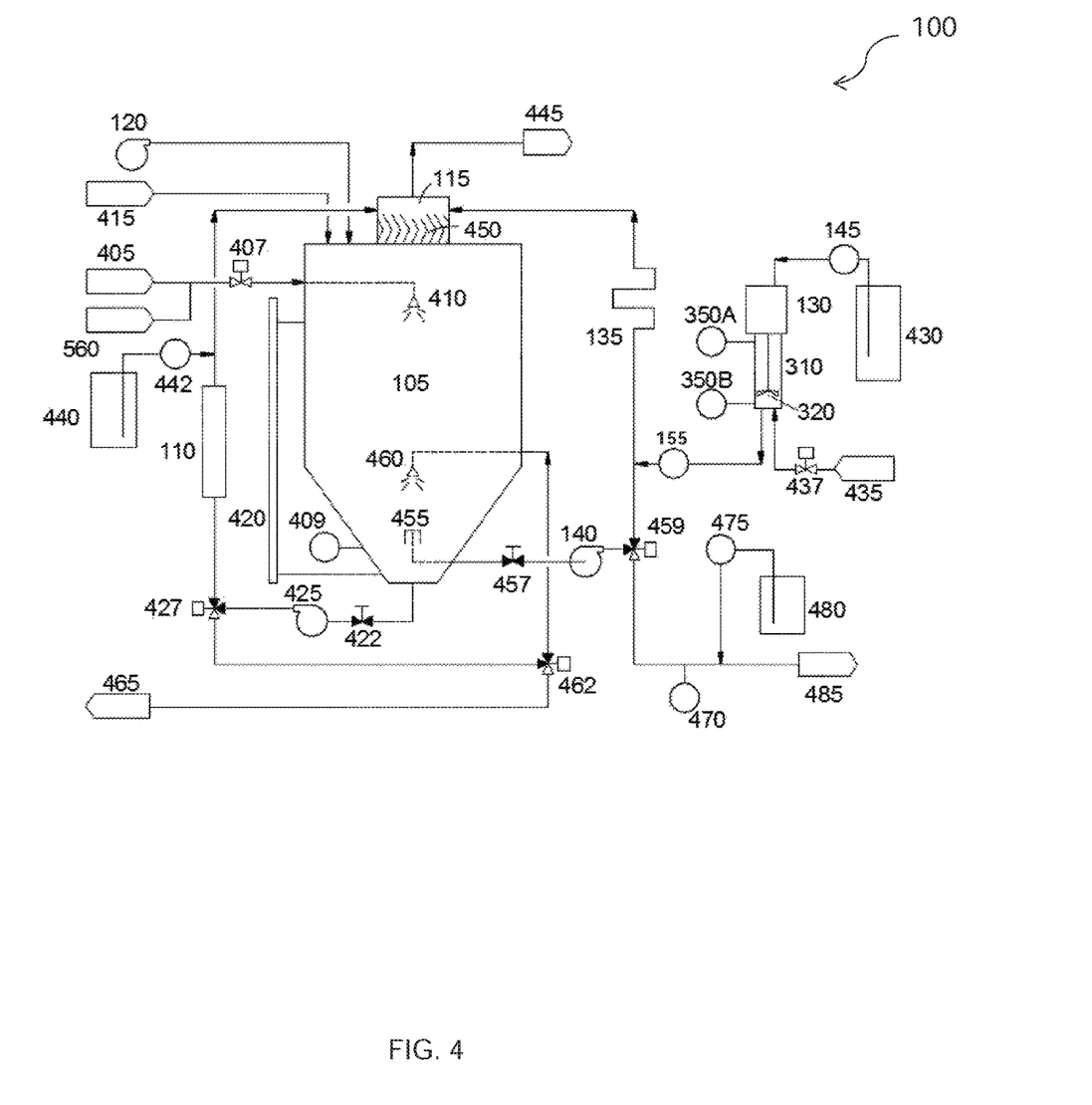
FIG. 4 illustrates a block diagram of an exemplary system for treating wastewater according to an embodiment.
Figure 5:
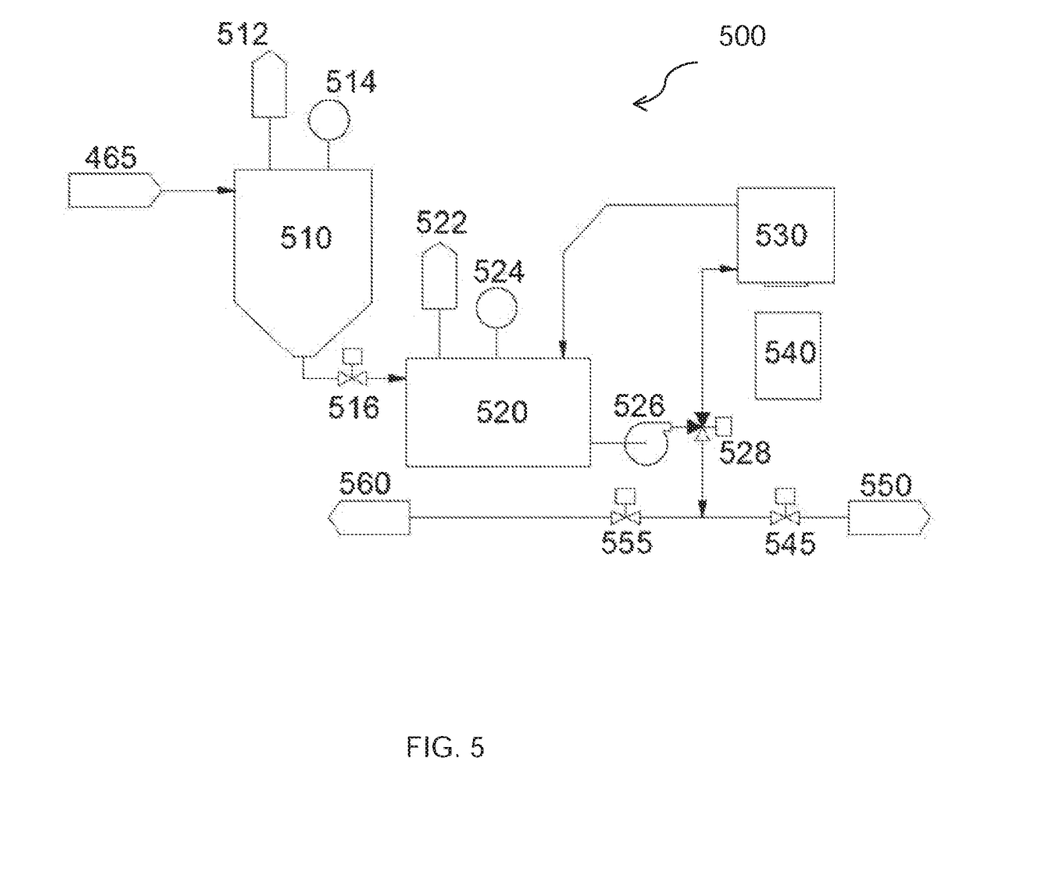
FIG. 5 illustrates a block diagram of an exemplary system for dewatering the sludge generated from treating wastewater for landfill disposal according to an embodiment.

Referring now to FIG. 4 and FIG. 5, when sludge from the treatment system 100 is ready to be sent to the dewatering system 500, the macerator pump 425 sends a 0.8 to 2.5 weight % wet solids/sludge stream 465 to sludge collection tank 510 along with a signal, such as, a "sludge transfer" signal to centrifuge unit 530 until the batch tank 105 is empty. During the sludge dewatering process, the sludge collection tank 510 is used as a surge tank.

In the absence of the dewatering system 500, the customer would have to deal with the issue of storing a large mass and volume of sludge onboard a marine vessel. For instance, a large volume of sludge (containing 0.8 to 2.5 wt. % solids) is generated after the first treatment cycle. The customer would need a tank with an enormous capacity to store this volume of sludge waste depending on duration of storage. By dewatering the 0.8-2.5 wt % wet solids, it is compacted to about 10 to 13 wt. % concentrated solids. The centrate obtained from the dewatering process can be reused by recirculating it back to the batch tank thereby reducing the volume of seawater usage. Thus, the customer would only have to store the small volume of compacted sludge onboard the vessel. Valve 555 is an actuated ball valve that is opened to allow centrate flow 560 to be routed back to the batch tank 105 at the treatment unit.

After the centrate 560 is sent back to treatment system 100, the sludge collection tank 510 volume is transferred to the recirculation tank 520 via gravity flow through on/off valve 516. This empties the sludge collection tank 510 and it is then ready to receive a next waste batch of sludge/wet solids from the treatment system 100.

The dewatering system 500 can then send a signal, such as, a "centrifuge ready to receive" signal to treatment system 100 in preparation for the next sludge transfer batch from treatment system 100. The dewatering system 500 begins operation when recirculation tank 520 if full.

The recirculation pump 526 withdraws sludge from recirculation tank 520. Pump 526 passes the sludge stream through centrifuge 530. In the centrifuge 530, centrifugal force, which is generated by high speed rotations, is used to separate the entrained solids from the fluid. The centrifuge 530 includes an internal centrifuge bowl for receiving the fluid (not shown). In one aspect, as described in U.S. Pat. Nos. 6,224,532, 6,461,286, 6,478,724, 6,932,757 and 7,044,904, the contents of which are incorporated by reference herein, centrifuge 530 can include a spindle configured to rotate about an axis, wherein the internal centrifuge bowl is attached to the spindle to rotate therewith; a drive shaft; and a scraper blade attached to the drive shaft to rotate therewith, wherein the scraper blade can selectively remove solids accumulated on an internal surface of the centrifuge bowl; and a clutch mechanism. As the sludge enters the spinning centrifuge, it forms an annulus next to the walls of the centrifuge bowl. Due to the centrifugal force, the dewatered denser solid material moves outwardly toward the walls of the centrifuge bowl while at the same time, the liquid overflows from the bowl and is gravity drained into recirculation tank 520. The liquid is relatively devoid of solids. The 10 to 13 wt. % solids is retained on the walls of the centrifuge. This continues for a preset time interval while the fluid is separated from the entrained solids of the stream. After the preset time period expires, the spinning centrifuge bowl slows to a stop and the dewatered solids are scraped from the centrifuge bowl by internal scrapers. As these solids are scraped/dislodged from the bowl, they are allowed to fall by gravity into the dewatered solids collection container 540. The dewatered solids collection container 540 may be positioned beneath the centrifuge 530.

During this complete operation, level detectors 514 and 524 can monitor the levels in the associated tanks 510 and 520. Tanks 510 and 520 are provided with atmospheric tank vents 512 and 522, respectively. Any remaining centrate water 550 in the recirculation tank 520 can be discharged through valves 528 and 545 from the dewatering system 500.

In one aspect, the dewatering system can compact sludge from 0.8-2.5 wt % to 10-13 wt % solids, thus reducing the mass and volume of sludge requiring disposal. The customer then only has to worry about disposing the 10-13 wt % solids. The dewatering system 500 operates concurrently with the batch treatment system 100.

In one aspect, the treatment of wastewater may be carried onboard a marine vessel. This onboard treatment is generally utilized at those locations where there is limited access to a municipal water treatment plant or equivalent facility. Examples of such locations are ships and off-shore drilling platforms.

The one or more embodiments of the system have a reduced footprint and by reducing the number of components and the complexity to separate solids and liquids in wastewater (automatic valves, number of electrolytic cells, routine maintenance steel support structure, power supply, control systems), the system is easier to operate. This also reduces material costs and manufacturing man-hour costs.

Type Approval Certification Tests

Type Approval Certification tests were performed on Applicant's treatment system under the supervision of Bureau Veritas (BV) notified body. The treatment system was operated under "Guidelines for Performance Tests for Sewage Treatment Plants with respect to Effluent Standards" adopted by the Marine Environmental Protection Committee (MEPC) of the International Maritime Organization (IMO) in resolution MEPC 2(VI) in 3 Dec. 1976; and modifications adopted at MEPC 159(55) in 13 Oct. 2006 and MEPC 227(64) in 5 Oct. 2012.

Raw Sewage Characteristics for Type Tests: The raw sewage quality during entire type test period met the requirements stipulated in Section 5.2 of MEPC.227(64) resolution. Table 1 lists geometric mean, minimum, and maximum values of TSS, $BOD_5$, COD and Turbidity for raw sewage (influent).

TABLE 1

Raw Sewage Characteristics during Type Testing of Treatment System

| Parameter | Unit | MEPC.227(64) Requirement or Land-based Testing | Geometric Mean | Minimum | Maximum |
| --- | --- | --- | --- | --- | --- |
| TSS | mg/L | 500 (minimum) | 796 | 497 | 1,303 |
| $BOD_5$ | mg/L | Not specified | 211 | 127 | 281 |
| COD | mg/L | Not specified | 1,041 | 852 | 1,436 |
| Turbidity | NTU | Not specified | 427 | 190 | 590 |
| pH | — | Not specified | 7.1 | 6.7 | 7.4 |
| FC | CFU/100 mL | Not specified | >17,222 | 9,200 | >20,000 |

Notes:
TSS—Total Suspended Solids,
$BOD_5$—5-day Biochemical Oxygen Demand,
COD—Chemical Oxygen Demand,
FC—Fecal Coliform,
TRC—Total Residual Chlorine,
TN—Total Nitrogen, and
TP—Total Phosphorus.
For Geometric calculations, FC values analyzed as >20,000 CFU/100 mL are considered as 20,000 CFU/100 mL.

Dechlor Effluent Characteristics of Type Tests: This stream represents the overboard effluent exiting the treatment system. Table 2 lists geometric mean, minimum, and maximum values of TSS, BOD$_5$, COD and Turbidity for dechlor effluent.

TABLE 2

Dechlor Effluent Characteristics achieved by Treatment System

| Parameter | Unit | Effluent Limit per IMO MEPC.227(64) | Revised Effluent Limits for OMNIPURE ™ Series 64 Gen II STPs (Dilution Factor: 0.67) | Geometric Mean | Min. | Max. |
|---|---|---|---|---|---|---|
| TSS | mg/L | 35 × $Q_i/Q_e$ | 23 (35 × 0.67) | 14 | 9 | 35 |
| BOD$_5$ | mg/L | 25 × $Q_i/Q_e$ | 17 (25 × 0.67) | 13 | 2 | 23 |
| COD | mg/L | 125 × $Q_i/Q_e$ | 84 (125 × 0.67) | 48 | 40 | 60 |
| FC | CFU/100 mL | 100 | 100 | 23 | 1 | 609 |
| pH | unit | 6 to 8.5 | 6 to 8.5 | 7.0 | 6.7 | 7.4 |
| TRC | mg/L | <0.5 | <0.5 | 0.06 | 0.00 | 0.49 |
| TN | mg/L | 20 (or 70% reduction) | 20 (or 70% reduction) | NA | NA | NA |
| TP | mg/L | 1 (or 70% reduction) | 1 (or 70% reduction) | NA | NA | NA |

Notes:
TSS—Total Suspended Solids,
BOD$_5$—5-day Biochemical Oxygen Demand,
COD—Chemical Oxygen Demand,
FC—Fecal Coliform,
TRC—Total Residual Chlorine,
TN—Total Nitrogen,
TP—Total Phosphorus,
NA—Not analyzed.
For Geometric calculations, TRC values recorded as 0.0 mg/L are considered as 0.001 mg/L, while BOD$_5$ values recorded as <2.0 mg/L are considered as 2.0 mg/L.

Therefore, the present invention is well adapted to attain the ends and advantages mentioned as well as those that are inherent therein. The previous description is not intended to limit the invention, which may be used according to different aspects or embodiments without departing from the scopes thereof, and whose extent is univocally defined by the appended claims. The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

Furthermore, the particular illustrative embodiments disclosed above may be altered or modified and all such variations are considered within the scope and spirit of the present invention. While systems and methods are described in terms of "comprising," "containing," or "including" various devices/components or steps, it is understood that the systems and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

The invention claimed is:

1. A method for treating wastewater comprising:
   filling a batch tank with seawater until it reaches a first predetermined level;
   transferring the wastewater to the batch tank until a seawater and wastewater mix in the batch tank reaches a second predetermined level, wherein the wastewater comprises suspended solid particles;
   subjecting a stream of the seawater and wastewater mix to electrolysis within an electrolytic cell, wherein the electrolytic cell is mounted outside the batch tank;
   piping the electrolyzed stream to a quelling chamber, wherein the quelling chamber is mounted above the batch tank, and wherein the electrolyzed stream comprises entrained micro/fine gas bubbles generated during the electrolysis;
   injecting a diluted defoamer solution via a chemical injection pump from a defoamer storage chamber at the exit of the electrolytic cell;
   injecting a diluted polymer solution at upstream of an in-line mixer piping, wherein the polymer solution is piped into the quelling chamber substantially concurrently with the electrolyzed stream;
   enabling dispersion of the polymer solution and the electrolyzed stream as a fine shower over residual seawater and wastewater in the batch tank, wherein the polymer solution facilitates flocculation of the suspended solid particles;
   creating a distinct buoyant layer of the flocculated solid particles attached with the micro bubbles; and
   separating a substantially clarified effluent from the flocculated layer.

2. The method according to claim 1, further comprising macerating the suspended solid particles prior to the electrolysis step.

3. The method according to claim 1, wherein the defoamer solution manages excess foam buildup in the electrolyzed stream before it is piped to the quelling chamber.

4. The method according to claim 1, further comprising blending, in an in-situ polymer mixing system, a neat cationic polymer with a predetermined volume of service water to produce the diluted polymer solution, wherein the polymer mixing system comprises a polymer mixing chamber/column.

5. The method according to claim 4, wherein concurrently with the transferring of the seawater to the batch tank, pumping the neat cationic polymer into the polymer mixing chamber/column for the blending step.

6. The method according to claim 4, further comprising providing the polymer mixing chamber/column with a first/upper switch and a second/lower switch to detect polymer solution levels in the polymer mixing chamber/column and thereby ensure an optimal amount of the polymer solution is added to the batch tank.

7. The method according to claim 1, further comprising facilitating a settling time cycle to enable the separation of the substantially clarified effluent from the flocculated layer.

8. The method according to claim 1, further comprising discharging the clarified effluent from the batch tank.

9. The method according to claim 8, wherein the discharging of the clarified effluent is terminated when a third predetermined level is reached.

10. The method according to claim 9, further comprising spraying the batch tank with a mixed slurry to remove residual solid particles residing along an inside wall of the batch tank.

11. The method according to claim 8, further comprising neutralizing residual chlorine in the clarified effluent with one or more chemicals prior to the discharge step.

12. The method according to claim 11, further comprising measuring turbidity of the clarified effluent prior to and/or after the neutralization step.

13. The method according to claim 8, further comprising substantially trapping the flocculated layer in the batch tank using a device such that it is prevented from being discharged with the clarified effluent.

14. The method according to claim 13, further comprising pumping the flocculated layer from the batch tank into a sludge tank until a shutoff level is detected in the batch tank, wherein the shutoff level corresponds to a substantially empty batch tank.

15. The method according to claim 14, further comprising resuming filling of the batch tank with seawater to commence a subsequent cycle for treating the wastewater.

16. The method according to claim 13, further comprising pumping the flocculated layer to a dewatering system, wherein the dewatering system comprises a centrifuge unit for dewatering the wet solids/sludge whereby entrained solids are compacted to a desired level.

17. The method according to claim 16, further comprising recirculating a centrate generated during the solids/sludge dewatering step to the batch tank for use during a subsequent treatment cycle.

18. The method according to claim 17, wherein the centrate is added back to the batch tank prior to the addition of seawater during the subsequent treatment cycle, and wherein the centrate supplements the seawater.

19. A system for treating wastewater comprising:
a batch tank for receiving wastewater and seawater, wherein the wastewater comprises suspended solid particles;
an electrolytic cell in operable communication with the batch water tank, wherein the electrolytic cell is mounted outside the batch tank, and wherein a stream of the seawater and wastewater mix is subjected to electrolysis within an electrolytic cell, wherein the electrolyzed stream comprises entrained micro/fine gas bubbles generated during the electrolysis;
a quelling chamber, wherein the quelling chamber is mounted above the batch tank and is in fluidic communication with the batch tank; and
an in-situ polymer mixing system for blending a neat polymer with a stream of service water to produce a polymer solution, wherein the polymer solution facilitates flocculation of the suspended solid particles
wherein the batch tank comprises one or more sensors, wherein the one or more sensors are configured for detecting:
a first predetermined level, wherein the first predetermined level corresponds to a predetermined seawater fill level in the batch tank;
a second predetermined level, wherein the second predetermined level corresponds to a predetermined wastewater fill level in the batch tank;
wherein the quelling chamber comprises a coalescing pack having integral flow diffuser plates for dispersing the polymer solution and the electrolyzed stream as a fine shower over residual seawater and wastewater in the batch tank to create a distinct buoyant layer of the flocculated solid particles attached with the micro bubbles with substantially clarified effluent beneath the flocculated layer.

20. The system according to claim 19, wherein the system is skid-mounted.

21. The system according to claim 19, further comprising a defoamer injector, wherein the defoamer injector is located outside the batch tank and in proximity to the electrolytic cell.

22. The system according to claim 19, further comprising a dechlorination injector for neutralizing the clarified effluent, wherein the dechlorination injector is located in proximity to a port for discharging the clarified effluent.

23. The system according to claim 19, further comprising a dewatering system, wherein the dewatering system comprises a centrifuge for receiving the flocculated solid particles in a wet slurry form.

24. The system according to claim 23, wherein the dewatering system further comprises piping for circulating a centrate generated from centrifugation/dewatering of the flocculated solid particles/wet slurry to the batch tank.

* * * * *